(12) United States Patent
Guo et al.

(10) Patent No.: US 11,193,418 B2
(45) Date of Patent: Dec. 7, 2021

(54) DOUBLE-CYLINDER INTERNAL COMBUSTION ENGINE

(71) Applicant: NORTHWEST A&F UNIVERSITY, Shaanxi (CN)

(72) Inventors: Kangquan Guo, Shaanxi (CN); Junchang Zhang, Shaanxi (CN); Hongling Jin, Shaanxi (CN); MingFang Wu, Shaanxi (CN); ZhiJie Liu, Shaanxi (CN)

(73) Assignee: NORTHWEST A&F UNIVERSITY, Xianyang (CN)

( * ) Notice: Subject to any disclaimer, the term of this patent is extended or adjusted under 35 U.S.C. 154(b) by 0 days.

(21) Appl. No.: 16/744,995

(22) Filed: Jan. 16, 2020

(65) Prior Publication Data

US 2021/0003070 A1  Jan. 7, 2021

(30) Foreign Application Priority Data

Jul. 1, 2019 (CN) .......................... 201910586827.8
Jul. 19, 2019 (CN) .......................... 201910656655.7

(51) Int. Cl.
*F02B 75/24* (2006.01)
*F01L 1/047* (2006.01)
(Continued)

(52) U.S. Cl.
CPC .............. *F02B 75/24* (2013.01); *F01L 1/047* (2013.01); *F02B 75/32* (2013.01); *F16C 19/04* (2013.01); *F02B 2075/1808* (2013.01)

(58) Field of Classification Search
CPC .. F02B 75/24; F02B 75/32; F02B 2075/1808; F01L 1/047; F01L 1/46; F01L 1/02;
(Continued)

(56) References Cited

U.S. PATENT DOCUMENTS 2,450,912 A * 10/1948 Putnam ................. F02B 75/246
74/55
2,618,250 A * 11/1952 Stewart .................. F02B 25/00
123/55.7
(Continued)

FOREIGN PATENT DOCUMENTS

CN     1561428 A      1/2005
CN     2731115 Y     10/2005
(Continued)

*Primary Examiner* — Hung Q Nguyen

(57) ABSTRACT

The present invention relates to internal combustion engines, and discloses a double-cylinder internal combustion engine. The double-cylinder internal combustion engine of the present invention adopts a curved groove ball bearing mechanism to replace crank-connecting rod mechanisms since traditional internal combustion engines have a complicated structure, high material requirements, high processing difficulty, and the inertia effect and noises thereof are hard to be eliminated. Two inner rings of the curved groove ball bearing mechanism are fixedly connected, and a valve mechanism and an ignition mechanism are driven through a gear pair, so that the two sets of cylinders and pistons reciprocate in opposite directions to automatically balance reciprocating inertia thereof. Compared with the prior art, the present invention has simple motion forms which only consist of the rotary motion and the reciprocating motion, and low noises are produced. The inertia of the reciprocating motion is automatically offset, causing small vibrations.

7 Claims, 3 Drawing Sheets

(51) Int. Cl.
*F16C 19/04* (2006.01)
*F02B 75/32* (2006.01)
*F02B 75/18* (2006.01)

(58) Field of Classification Search
CPC ...... F16C 19/04; F16C 2360/22; F16C 19/54; F01B 9/06
See application file for complete search history.

(56) References Cited

U.S. PATENT DOCUMENTS 3,192,783 A * 7/1965 Cruzan ............... F01B 3/06
   74/424.89
4,796,514 A * 1/1989 Richter ............... F16H 21/50
   92/33

FOREIGN PATENT DOCUMENTS

| CN | 202091041 U | 12/2011 |
| CN | 109707509 A | 5/2019 |

* cited by examiner

DOUBLE-CYLINDER INTERNAL COMBUSTION ENGINE

CROSS-REFERENCE TO RELATED APPLICATIONS

This application claims the benefits of priority from Chinese Patent Application No. 201910586827.8, filed on date of Jul. 1, 2019, and Chinese Patent Application No. 201910656655.7, filed on data of Jul. 19, 2019. The content of the aforementioned applications, including any intervening amendments thereto, are incorporated herein by reference.

TECHNICAL FIELD

The present application relates to power machinery, particularly to a double-cylinder internal combustion engine, and more particularly to a double-cylinder internal combustion engine based on a motion conversion mechanism of double cageless curved groove ball bearings.

BACKGROUND OF THE INVENTION

Reciprocating piston internal combustion engines based on crank-connecting rod mechanisms have greatly improved the quality of people's life since it has been invented. It has promoted the industrial revolution and the development of transportation technology, and people are allowed to travel faster, more comfortable, and convenient. However, cranks have the disadvantages of complicated structures, high material requirements and high processing difficulty. Further, the stress and motion of connecting rods are complex, which causes complex inertial effects and noises. Hence, such problems are required to be continuously improved in the engine industry.

Since the internal combustion engine is invented, it is a power machinery in which liquids or gaseous fuels burn in a cylinder, and the emitted heat energy is directly converted into mechanical power. Common reciprocating piston internal combustion engines are mainly composed of cylinders, pistons, cranks and connecting rods. The cylinder is a space that implements the working cycle and generates power; the piston can reciprocate in the cylinder liner, and the fuel burns in the cylinder. The generated power pushes the piston to reciprocate, and the connecting rod pushes the crankshaft to rotate, and the power is output from a flywheel. During operation, the small end of the connecting rod reciprocates with the piston, and the big end of the connecting rod rotates with the crank pin about the axis of the crankshaft, and the shaft between the big and small ends of the connecting rod makes a complex swing motion. The crankshaft is configured to convert the reciprocating motion of the piston into a rotary motion and transfer the work done by the expansion stroke to drive vehicles or mechanical equipment.

Chinese Patent Application No. 201910190746.6 disclosed a reciprocating piston internal combustion engine without a crank-connecting rod mechanism. The reciprocating cycle of the engine piston is realized by the extending stroke effect of cageless curved groove ball bearings and the vacuum return stroke effect of a plunger cylinder. However, after the plunger cylinder is worn, the leakage will affect the reliability of the return stroke of the engine piston.

Chinese Patent Application No. 201910392199.X disclosed a motion conversion mechanism of double cageless curved groove ball bearings, which can realize the mutual conversion of rotary motion and reciprocating linear motion.

On this basis, Chinese Patent Application No. 201910459566.3 disclosed an internal combustion engine based on the motion conversion mechanism, and the moving parts of the internal combustion engine are rotating parts which are axisymmetric. However, the inertia of the reciprocating motion of the piston and the outer ring needs to be eliminated.

In order to overcome the reciprocating inertia of the piston and the outer ring of a single-cylinder internal combustion engine, the present application discloses a double-cylinder internal combustion engine, in which two sets of cylinders and pistons are symmetrically arranged to eliminate the inertial force of the reciprocating motion.

SUMMARY OF THE INVENTION

The double-cylinder internal combustion engine achieves the above-mentioned object of the invention by using a cageless curved groove ball bearing to achieve reciprocating motion with a large swing, and the double cageless curved groove ball bearings can achieve a reliable reciprocation with thrust and return strokes. The present application designs a double-cylinder internal combustion engine in which two sets of crank-connecting rod mechanisms are replaced with two motion conversion mechanisms of the cageless curved groove ball bearings. Two inner rings of the cageless curved groove ball bearings are fixedly connected, and the valve mechanism and the ignition or fuel injection mechanism are driven by a gear pair, so that the two sets of cylinders and pistons to move in opposite directions to balance respective reciprocating inertia thereof. The present invention adopts the following technical solutions to achieve the above-mentioned objects.

Provided is a double-cylinder internal combustion engine, comprising: a valve gear, a valve shaft bearing, a valve shaft, a first valve cam, a first intake valve, a first exhaust valve, a first spark plug or oil nozzle, a first piston, a first cylinder, a first outer ring, two inner rings, an inner ring bearing, an inertia gear, a second cylinder, a second piston, a second outer ring, a second spark plug or oil nozzle, a second exhaust valve, a second intake valve, a second valve cam and a frame;

wherein the first cylinder and the second cylinder have the same shape and weight, and are symmetrically arranged at both ends of the inner rings; the first piston and the second piston have the same shape and weight, and are symmetrically arranged at both ends of the inner ring; the second piston is eccentrically and fixedly connected to the second outer ring, and the first piston is eccentrically and fixedly connected to the first outer ring; the two inner rings are mounted on the frame via the inner ring bearing; the inertia gear is mounted at a middle of the two inner rings to output turning power of the two inner rings, and the valve gear drives the valve gear, the valve shaft bearing, the valve shaft, the first spark plug or oil nozzle and the second spark plug or oil nozzle; curved grooves are symmetrically arranged at two ends of the two inner rings and extend outward or inward at the same time, so that the first outer ring and the second outer ring drive the first piston and the second piston to move outward or inward at the same time, eliminating an inertia force of a reciprocating motion.

In some embodiments, an axis of the second outer ring offsets from an axis of the second piston for a first distance; an axis of the first outer ring offsets from an axis of the first piston for a second distance; the first distance is equal to the second distance; the first outer ring and the second outer ring are symmetrically arranged, and the first piston and the second piston are symmetrically arranged.

In some embodiments, when the two inner rings rotate for one circle, the first outer ring and the second outer ring each pendulate for 2 cycles comprising outward pendulation exhaust, inward pendulation intake; outward pendulation compression and inward pendulation power.

In some embodiments, the first and second valve cams have the same valve phase; the first and second valve cams compress at the same time, and work at the same time.

In some embodiments, the first and second valve cams have different valve phases.

In some embodiments, two or more double-cylinder internal combustion engines are connected in parallel via an intermediary gear to form a multi-cylinder internal combustion engine.

In some embodiments, the double-cylinder internal combustion engine is based on a three-cycle curved groove ball bearing; when the two inner rings rotate for one circle, the first and second outer rings pendulate for 3 cycles comprising outward pendulation exhaust, inward pendulation intake; outward pendulation compression, inward pendulation power; outward pendulation exhaust and inward pendulation intake.

Compared with the prior art, the double-cylinder internal combustion engine disclosed in the present application has the following advantages.

1. The present invention has simple motion forms which only includes the rotary motion and reciprocating motion, and low noises are produced.

2. The inertia of the reciprocating motion is automatically eliminated, causing small vibrations.

3. The present invention has low processing requirements for parts, so the internal combustion engine of the present invention is easy to be manufactured.

4. The double-cylinder internal combustion engine based on a three-cycle curved groove ball bearing is uniformly worn.

Figure 1:
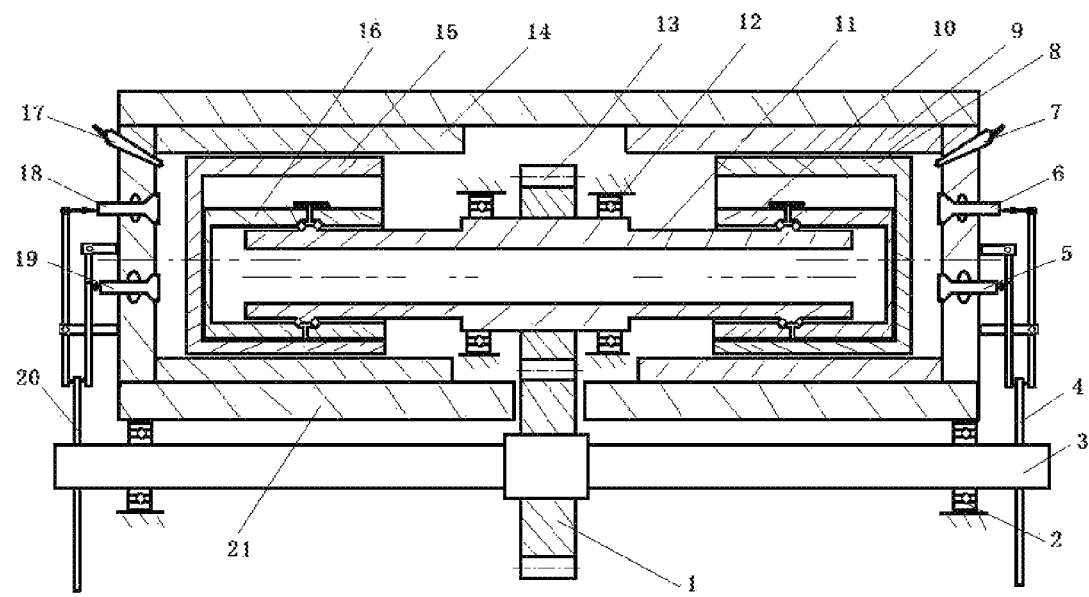
FIG. 1 is a schematic diagram of a double-cylinder internal combustion engine.

In the drawings, 1, valve gear; 2, valve shaft bearing; 3, valve shaft; 4, first valve cam; 5, first intake valve; 6, first exhaust valve; 7, first spark plug or oil nozzle; 8, first piston; 9, first cylinder; 10, first outer ring; 11, two inner rings; 12, inner ring bearing; 13, inertia gear; 14, second cylinder; 15, second piston; 16, second outer ring; 17, second spark plug or oil nozzle; 18, second exhaust valve; 19, second intake valve; 20, second valve cam; and 21, frame.

DETAILED DESCRIPTION OF EMBODIMENTS

Figure 2:
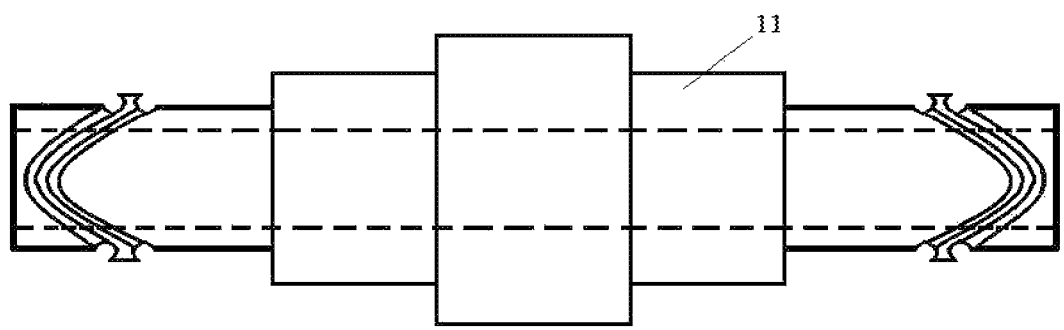
FIG. 2 is a schematic diagram of two inner rings of the double-cylinder internal combustion engine based on a two-cycle curved groove ball bearing.
Figure 3:
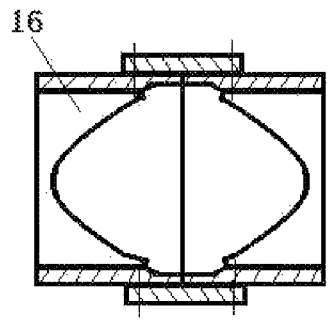
FIG. 3 is a schematic diagram of a second outer ring of the double-cylinder internal combustion engine based on the two-cycle curved groove ball bearing.
Figure 4:
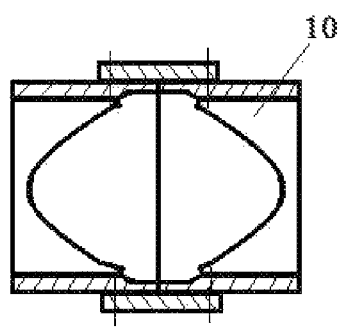
FIG. 4 is a schematic diagram of a first outer ring of the double-cylinder internal combustion engine based on the two-cycle curved groove ball bearing.
Figure 5:
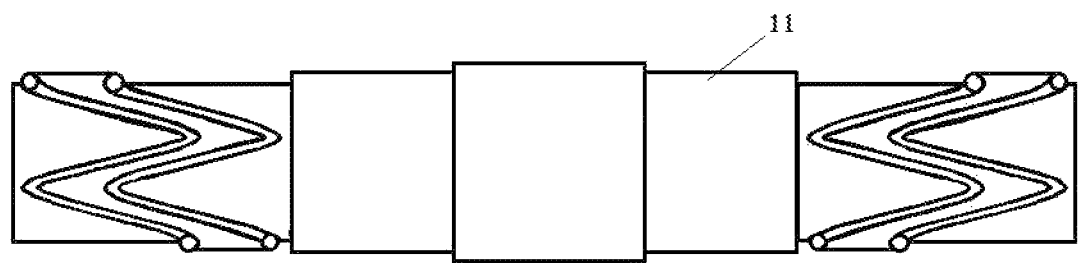
FIG. 5 is a schematic diagram of the two inner rings of the double-cylinder internal combustion engine based on a three-cycle curved groove ball bearing.

The present application will be further described below with reference to embodiments and accompanying drawings. As shown in FIGS. 1-5, illustrated is a double-cylinder internal combustion engine, comprising a valve gear 1, a valve shaft bearing 2, a valve shaft 3, a first valve cam 4, a first intake valve 5, and a first exhaust valve 6, a first spark plug or oil nozzle 7, a first piston 8, a first cylinder 9, a first outer ring 10, two inner rings 11, an inner ring bearing 12, an inertia gear 13, a second cylinder 14, a second piston 15, a second outer ring 16, a second spark plug or oil nozzle 17, a second exhaust valve 18, a second intake valve 19, a second valve cam 20 and a frame 21. The first and second cylinders have the same shape and weight, and are symmetrically arranged at both ends of the inner rings 11. The first piston 8 and the second piston 15 have the same shape and weight, and are symmetrically arranged at both ends of the inner rings 11. The second piston 15 is eccentrically and fixedly connected to the second outer ring 16, and the first piston 8 is eccentrically and fixedly connected to the first outer ring 10. The two inner rings 11 are mounted on the frame 21 via the inner ring bearing 12; the inertia gear 13 is mounted at a middle of the two inner rings to output turning power of the two inner rings 11, and the valve gear drives the valve gear 1, the valve shaft bearing 2, the valve shaft 3, the first spark plug or oil nozzle 7 and the second spark plug or oil nozzle 17; curved grooves are symmetrically arranged at two ends of the two inner rings 11 and extend outward or inward at the same time, so that the first outer ring 10 and the second outer ring 16 drive the first piston 8 and the second piston 15 to move outward or inward at the same time, eliminating an inertia force of a reciprocating motion.

In some embodiments, an axis of the second outer ring 16 offsets from an axis of the second piston 15 for a first distance; an axis of the first outer ring 10 offsets from an axis of the first piston 8 for a second distance; the first distance is equal to the second distance; the first outer ring 10 and the second outer ring 16 are symmetrically arranged, and the first piston 8 and the second piston 15 are symmetrically arranged.

In some embodiments, when the two inner rings 11 rotate for one circle, the first outer ring 10 and the second outer ring 16 each pendulate for 2 cycles comprising outward pendulation exhaust, inward pendulation intake; outward pendulation compression and inward pendulation power.

In some embodiments, the first and second valve cams have different valve phases, that is, when the phase of the second valve cam 20 is inward pendulation intake, the phase of the first valve cam 4 is inward pendulation power.

In some embodiments, two or more double-cylinder internal combustion engines are connected in parallel via an intermediary gear to form a four-cylinder internal combustion engine, in which valve phases are adjusted to allow a cylinder to work per stroke.

Figure 6:
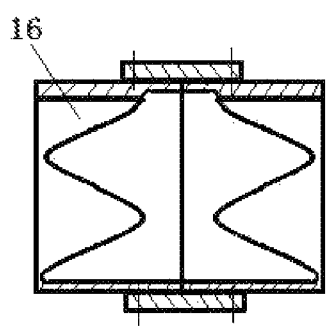
FIG. 6 is a schematic diagram of the second outer ring of the double-cylinder internal combustion engine based on the three-cycle curved groove ball bearing.
Figure 7:
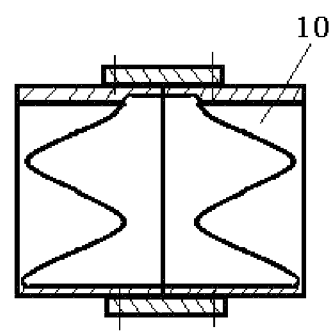
FIG. 7 is a schematic diagram of the first outer ring of the double-cylinder internal combustion engine based on the three-cycle curved groove ball bearing.

In some embodiments, as shown in FIGS. 1 and 6-8, the double-cylinder internal combustion engine is based on a three-cycle curved groove ball bearing; when the two inner rings 11 rotate for one circle, the first and second outer rings pendulate for 3 cycles comprising outward pendulation exhaust, inward pendulation intake; outward pendulation compression, inward pendulation power; outward pendulation exhaust, and inward pendulation intake. Description thereof similar to that of the above double-cylinder internal combustion engine will not be repeated herein.

The application disclosed a double-cylinder internal combustion engine, in which double cageless curved groove ball bearings are symmetrically arranged. Based on the concept and principle of the present invention, cylinders of the double-cylinder internal combustion engine of the present invention can be designed into different sizes, and structural changes and improvements can be made to the present invention, which shall fall within the scope of the present invention.

What is claimed is:

1. A double-cylinder internal combustion engine, comprising: a valve gear, a valve shaft bearing, a valve shaft, a first valve cam, a first intake valve, a first exhaust valve, a first spark plug or oil nozzle, a first piston, a first cylinder, a first outer ring, two inner rings, an inner ring bearing, an inertia gear, a second cylinder, a second piston, a second outer ring, a second spark plug or oil nozzle, a second exhaust valve, a second intake valve, a second valve cam and a frame;

wherein the first cylinder and the second cylinder have the same shape and weight, and are symmetrically arranged at both ends of the inner ring; the first piston and the second piston have the same shape and weight, and are symmetrically arranged at both ends of the inner rings; the second piston is eccentrically and fixedly connected to the second outer ring, and the first piston is eccentrically and fixedly connected to the first outer ring; the two inner rings are mounted on the frame via the inner ring bearing; the inertia gear is mounted at a middle of the two inner rings to output turning power of the two inner rings, and the valve gear drives the valve gear, the valve shaft bearing, the valve shaft, the first spark plug or oil nozzle and the second spark plug or oil nozzle; curved grooves are symmetrically arranged at two ends of the two inner rings and extend outward or inward at the same time, so that the first outer ring and the second outer ring drive the first piston and the second piston to move outward or inward at the same time, eliminating an inertia force of a reciprocating motion.

2. The double-cylinder internal combustion engine of claim 1, wherein an axis of the second outer ring offsets from an axis of the second piston for a first distance; an axis of the first outer ring offsets from an axis of the first piston for a second distance; the first distance is equal to the second distance; the first outer ring and the second outer ring are symmetrically arranged, and the first piston and the second piston are symmetrically arranged.

3. The double-cylinder internal combustion engine of claim 1, wherein when the two inner rings rotate for one circle, the first outer ring and the second outer ring each pendulate for 2 cycles comprising outward pendulation exhaust, inward pendulation intake; outward pendulation compression and inward pendulation power.

4. The double-cylinder internal combustion engine of claim 1, wherein the first and second valve cams have the same valve phase; the first and second valve cams compress at the same time, and work at the same time.

5. The double-cylinder internal combustion engine of claim 1, wherein the first and second valve cams have different valve phases.

6. The double-cylinder internal combustion engine of claim 1, wherein two or more double-cylinder internal combustion engines are connected in parallel via an intermediary gear to form a multi-cylinder internal combustion engine, in which valve phases are adjusted to allow a cylinder to work per stroke.

7. The double-cylinder internal combustion engine of claim 1, wherein the double-cylinder internal combustion engine is based on a three-cycle curved groove ball bearing; when the two inner rings rotate for one circle, the first and second outer rings pendulate for 3 cycles comprising outward pendulation exhaust, inward pendulation intake; outward pendulation compression, inward pendulation power; outward pendulation exhaust, and inward pendulation intake.

* * * * *